3,040,235
CURRENT SUPPLY SYSTEM
Raymond E. Schemel, Woolwich Borough, London, England, and Anthony Tompos, New York, N.Y., assignors to Bell Telephone Laboratories, Incorporated, New York, N.Y., a corporation of New York
Filed Dec. 2, 1959, Ser. No. 856,834
4 Claims. (Cl. 321—19)

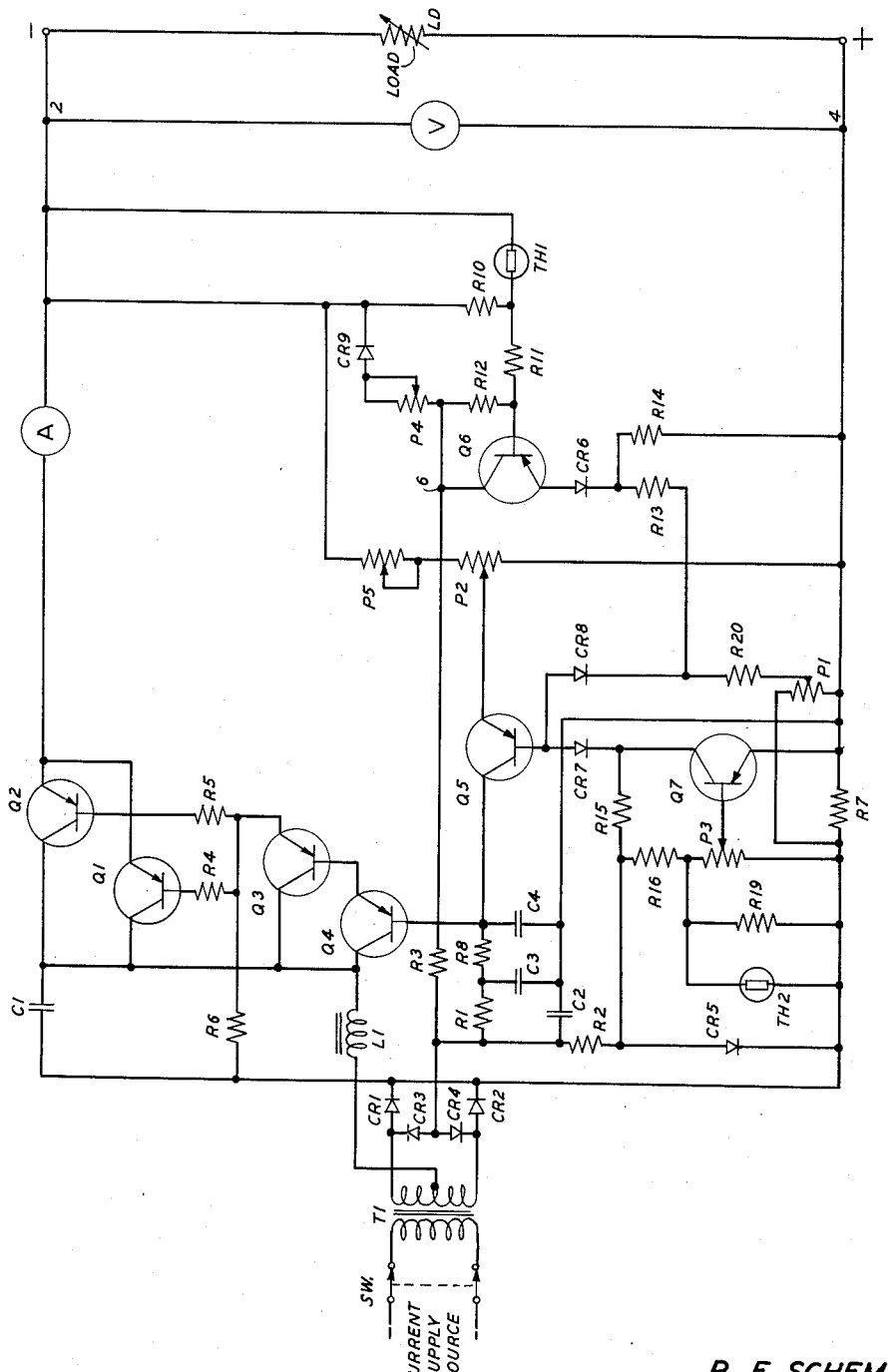

This invention relates to current supply systems and more particularly to current supply systems in which the supply of current to a load is regulated to minimize changes of load voltage.

An object of the invention is to provide an improved current supply circuit for minimizing load voltage changes over a normal operating range of load current and for limiting the load current so that it will not exceed the normal operating range.

In accordance with this invention, this objective is achieved by a series type transistor regulator comprising first and second rectified power supplies obtained from a common secondary transformer winding. The transistor regulator is controlled by an error signal derived from the output of the first rectifier and an error signal proportional to the input voltage change across an impedance means disposed between an output terminal of the second rectifier and the load, and the output current of the regulator is limited to a predetermined maximum value by circuit means responsive to a signal which is proportional to the output current.

The nature of the invention and its distinguishing features and advantages will be more clearly understood from the following detailed description and the accompanying drawing, the single FIGURE of which is a schematic view of a regulated current supply system embodying the invention.

Referring now to the drawing, the center-tapped secondary winding of a transformer $T_1$ is connected to the full wave rectifier comprising the rectifying elements $CR_1$ and $CR_2$. The rectified voltage is filtered by the network comprising inductor $L_1$ and capacitor $C_1$, and regulated by the series transistors $Q_1$ and $Q_2$ in the negative output lead. The base currents of transistors $Q_1$ and $Q_2$ are controlled by the transistor amplifiers $Q_3$ and $Q_4$ and the error detector comprising transistors $Q_5$ and $Q_6$ described hereinafter. A second voltage supply comprises the secondary winding of transformer $T_1$ and the bridge rectifier including the rectifying elements $CR_1$, $CR_2$, $CR_3$ and $CR_4$. Filtering for this supply is provided by the network comprising resistor $R_1$ and capacitors $C_2$ and $C_3$. The negative side of the second voltage supply is connected to the constant voltage or Zener diode $CR_9$ and potentiometer $P_4$ through resistor $R_3$. Approximately constant voltage is maintained across the diode $CR_9$ and potentiometer $P_4$ and this voltage also appears across the voltage divider comprising resistors $R_{12}$, $R_{11}$, $R_{10}$ and thermistor $TH_1$. Three current paths are connected across the output of the second rectifier comprising the rectifying elements $CR_1$, $CR_2$, $CR_3$ and $CR_4$. One path comprises the load $L_D$, resistor $R_{10}$, thermistor $TH_1$, resistor $R_{11}$, and resistor $R_{12}$; a second path comprises the load $L_D$, diode $CR_9$, and potentiometer $P_4$; and a third path comprises transistor $Q_6$, constant voltage diode $CR_6$ and resistor $R_{14}$. Potentiometers $P_5$ and $P_2$ are connected across the load $L_D$.

The operation of the regulating arrangement may be described as follows: With the positive output terminal 4 as the reference point, an increase in the output or load voltage will cause the junction of resistors $R_{11}$ and $R_{12}$ to become more negative. This causes the potential difference between the base and emitter of transistor $Q_6$ to increase and thereby permit a greater flow of current in the circuit including the emitter-collector path of transistor $Q_6$, the constant voltage or Zener diode $CR_6$, resistor $R_{14}$ and the bridge rectifier comprising rectifying elements $CR_1$, $CR_2$, $CR_3$ and $CR_4$. As a result, the voltage drop across resistor $R_{14}$ increases and the signal provided through the asymmetrically conducting device $CR_8$ applies a potential to the base of transistor $Q_5$ which renders it more negative and thereby increases the potential difference between the base and emitter of transistor $Q_5$. Similarly, if the input voltage increases the voltage across the potentiometer $P_4$ and the diode $CR_9$ increases slightly and a part of this increase will appear at the base of transistor $Q_6$ and from there be transferred to resistor $R_{14}$. In either case, the difference in potential between the emitter and base of transistor $Q_5$, which is determined by the voltage across resistor $R_{14}$ and the voltage across the effective portion of potentiometer $P_2$, will increase and result in an increase of the collector current of transistor $Q_5$. Normally, the collector potential of transistor $Q_5$ is negative with respect to the negative output terminal 2. When the collector current of transistor $Q_5$ increases the voltage drop across resistor $R_8$ increases thereby reducing the potential difference between the collector of transistor $Q_5$ and the negative output terminal 2. This results in a decreased potential difference between the emitter and base of each of transistor amplifiers $Q_3$ and $Q_4$, and tranistors $Q_1$ and $Q_2$. The base current of transistor $Q_4$ is derived from the output of transistor $Q_5$, while the base current of transistor $Q_3$ is derived from the output of transistor $Q_4$. The base currents of the series regulator transistors $Q_1$ and $Q_2$ are determined by transistors $Q_3$ and $Q_4$. The decreased potential difference between the emitter and base of each of transistors $Q_1$ and $Q_2$ causes the current flowing in the collector-emitter paths of transistors $Q_1$ and $Q_2$ and through the load $L_D$ to decrease and thereby minimize the initially assumed rise of load voltage.

If the input voltage or the output voltage decreases the voltage across resistor $R_{14}$ decreases resulting in an increased potential difference between the collector of transistor $Q_5$ and the negative output terminal 2. This results in an increased potential difference between the emitter and base of each of transistors $Q_3$, $Q_4$, $Q_1$ and $Q_2$. As a result, the current flowing in the collector-emitter paths of transistors $Q_1$ and $Q_2$ and through the load $L_D$ will increase to minimize the initially assumed reduction of load voltage.

The output current flowing through resistor $R_7$ produces a voltage drop proportional to it. Part of this voltage drop is applied as a positive feedback to the base of transistor $Q_5$ through potentiometer $P_1$ and resistor $R_{20}$. By adjusting potentiometer $P_1$ it is possible to obtain positive, zero or negative load current compensation. Similarly, by adjusting potentiometer $P_4$ it is possible to obtain positive, zero or negative line compensation.

The operation of the output or load current limiting arrangement may be described as follows: The asymmetrically conducting devices $CR_7$ and $CR_8$ form a gate circuit. The inputs to the gate circuit are the voltage across $R_{14}$ and the collector voltage of transistor $Q_7$. The more negative of the two signals is transmitted to the base of transistor $Q_5$ and the other one is excluded.

The collector voltage of transistor $Q_7$ is the signal used to limit the output current of the rectifier comprising rectifying elements $CR_1$ and $CR_2$ to a safe maximum. A constant voltage developed across the constant voltage or Zener diode $CR_5$ is impressed across the voltage divider including resistors $R_{16}$, $R_{19}$, thermistor $TH_2$ and potentiometer $P_3$. Normally, transistor $Q_7$ is saturated and only a very small voltage appears at its collector. As the load current increases the voltage across resistor $R_7$ increases thereby decreasing the potential difference between the emitter and base of transistor $Q_7$. At a predetermined current, depending on the setting of poteniometer $P_3$, transistor $Q_7$ comes out of saturation and its collector voltage increases negatively. When this voltage becomes more negative than the voltage across resistor $R_{14}$ the gate circuit admits the signal from transistor $Q_7$ through the asymmetrically conducting device $CR_7$ to the base of transistor $Q_5$. The potential difference between the base and emitter of transistor $Q_5$ which, up to this moment, was determined by the voltage across resistor $R_{14}$ and the voltage across the effective portion of potentiometer $P_2$ and was, therefore, decreasing to provide an increase in load current to maintain the load voltage substantially constant, increases almost instantaneously when the increased negative potential is applied through diode $CR_7$ to the base of transistor $Q_5$. As described heretofore, this results in an increase of the collector current of transistor $Q_5$ and a reduction of the poential difference between the collector of transistor $Q_5$ and the negative output terminal 2. The potential difference between the base and emitter of each of transistors $Q_3$, $Q_4$, $Q_1$ and $Q_2$ decreases thereby preventing further increase in output current and causing the output voltage to decrease or droop.

In the embodiment of the invention described above, the potential of output terminal 6 of the second rectifier is approximately minus 10 volts while the potential of output terminal 2 of the first rectifier is approximately minus 4 volts. The breakdown voltage of the Zener diodes $CR_9$ and $CR_6$ is greater (6 volts) than the output of the first rectifier. Thermistors $TH_1$ and $TH_2$ are included in the voltage divider networks of the regulating and limiting arrangements, respectively, to provide temperature compensation.

It is to be understood that the above-described arrangements are illustrative of the application of the principles of the invention. Other arrangements may be devised by those skilled in the art without departing from the spirit and scope of the invention.

What is claimed is:

1. Means for supplying current from an alternating current source to a load circuit comprising first and second rectifiers connected to said source, first and second transistors each having a collector, an emitter and a base, first and second impedance means, a first current path comprising in series the output terminals of said first rectifier, the collector-emitter path of said first transistor, said load circuit and said first impedance means, a second current path comprising in series the output terminals of said second rectifier, said second impedance means, said load circuit and said first impedance means, means comprising said second impedance means for deriving a first control signal having magnitude variations corresponding to load voltage changes, means for deriving a second control signal having magnitude variations corresponding to changes in the amount of current supplied to said load circuit through said first impedance means, means for impressing upon the base with respect to the emitter of said second transistor the one of said control signals having the greater magnitude, means for deriving from the collector-emitter circuit of said second transistor and impressing between the emitter and base of said first transistor a voltage for regulating the amount of current supplied to said load circuit when said first control signal is impressed upon the base of said second transistor, and a voltage for limiting the amount of current supplied to said load circuit when said second control signal is impressed upon the base of said second transistor.

2. Means for supplying current from an alternating current source to a load circuit comprising first and second rectifiers connected to said source, first, second and third transistors each having a collector, an emitter and a base, first, second and third impedance means, a first current path comprising in series the output terminals of said first rectifier, the collector-emitter path of said first transistor, said load circuit, and said first impedance means, a second current path comprising in series the output terminals of said second rectifier, the collector-emitter path of said second transistor, a constant voltage device, said second impedance means and said first impedance means, a shunt current path across the output of said second rectifier comprising in series said third impedance means and said load circuit, the base of said second transistor being connected to said third impedance means, means for impressing upon the base with respect to the emitter of said third transistor the greater one of a first potential derived from said second impedance means, said first potential having variations corresponding to changes in the magnitude of the voltage developed in said load circuit and variations corresponding to changes in the voltage supplied to said load circuit, and a second potential having variations corresponding to changes in the amount of current supplied to said load circuit through said first impedance means, means for deriving from the collector-emitter circuit of said third transistor and impressing between the emitter and base of said first transistor a voltage for regulating the amount of current supplied to said load circuit when said first potential is impressed upon the base of said third translator, and a voltage for limiting the amount of current supplied to said load circuit when said second potential is impressed upon the base of said third transistor.

3. Means for supplying current from an alternating current source to a load circuit comprising first and second rectifiers connected to said source, first, second and third transistors each having a collector, an emitter and a base, first, second, third and fourth impedance means, a first current path comprising in series the output terminals of said first rectifier, the collector-emitter path of said first transistor, said load circuit and said first impedance means, a second current path comprising in series the output terminals of said second rectifier, the collector-emitter path of said second transistor, a constant voltage device, said second impedance means and said first impedance means, a shunt current path across the output of said second rectifier comprising in series said third impedance means and said load circuit, a shunt current path across the output of said first rectifier comprising said fourth impedance means, the base of said second transistor being connected to said third impedance means, the emitter of said third transistor being connected to said fourth impedance means, means for impressing upon the base with respect to the emitter of said third transistor the greater one of a first potential derived from said second impedance means and a second potential derived from said first impedance means, said first potential having variations corresponding to changes in the magnitude of the voltage developed in said load cicuit and variations corresponding to changes in the voltage supplied to said load circuit, said second potential having variations corresponding to changes in the amount of current supplied to said load circuit, means for deriving from the collector-emitter circuit of said third transistor and impressing between the emitter and base of said first transistor a voltage for regulating the amount of current supplied to said load circuit when said first potential is impressed upon the base of said third transistor, and a voltage for limiting the amount of current supplied to said load circuit when said second potential is impressed upon the base of said third transistor.

4. The combination in accordance with claim 3 wherein said current supply source includes a transformer having primary and secondary windings, said first rectifier is a full wave rectifier comprising two rectifying elements, said second rectifier comprises four rectifying elements disposed in a bridge circuit, and said first and second rectifiers are connected to said secondary winding and include a common output terminal.

References Cited in the file of this patent
UNITED STATES PATENTS

| | | |
|---|---|---|
| 2,733,402 | Bixby | Jan. 31, 1956 |
| 2,904,742 | Chase | Sept. 15, 1959 |
| 2,914,720 | Merkel | Nov. 24, 1959 |
| 2,937,328 | Huge et al. | May 17, 1960 |
| 2,974,270 | Christiansen | Mar. 7, 1961 |

OTHER REFERENCES

"Transistor Power Supply," Harold D. Ervin, Electronics; June 20, 1958; pages 74 and 75.

T. F. Kopaczek: "Design of Transistor Regulated Power Supplies," Proc. I.R.E., vol. 46, page 1537; August 1958.